United States Patent
Gloge

[11] 3,832,030
[45] Aug. 27, 1974

[54] DELAY EQUALIZERS FOR MULTIMODE OPTICAL FIBERS

[75] Inventor: Detlef Christoph Gloge, Red Bank, N.J.

[73] Assignee: Bell Telephone Laboratories, Incorporated, Murray Hill, N.J.

[22] Filed: May 23, 1973

[21] Appl. No.: 363,023

[52] U.S. Cl. ......... 350/96 WG, 350/96 C, 350/189, 350/294
[51] Int. Cl. ............................................. G02b 5/14
[58] Field of Search ............... 350/96 WG, 189, 200

[56] References Cited
UNITED STATES PATENTS
3,547,526  12/1970  Devereux .......................... 350/200
3,759,590  9/1973  Arnaud ........................ 350/96 WG FOREIGN PATENTS OR APPLICATIONS
1,017,354  1/1966  Great Britain ................ 350/96 WG

*Primary Examiner*—John K. Corbin
*Attorney, Agent, or Firm*—D. I. Caplan

[57] ABSTRACT

The outputs of multimode optical fibers (i.e., fibers which support the simultaneous propagation of more than a single optical mode) suffer from signal distortion due to mode delay dispersion, that is, different modes travelling through the fibers at different forward velocities.

In order to reduce this mode delay distortion in multimode optical fibers, a pair of back-to-back curvilinear conical lenses is located between two similar fibers. These lenses convert large angle modes to small angle modes, and vice versa; thereby the variation in the total delay of all modes propagating through the two fibers i.e., the mode delay dispersion, is reduced by these lenses.

4 Claims, 4 Drawing Figures

3,832,030

DELAY EQUALIZERS FOR MULTIMODE OPTICAL FIBERS

FIELD OF THE INVENTION

This invention relates to the field of optical communications systems, and more particularly to controlling the signal distortion caused by mode dispersion in optical fibers.

BACKGROUND OF THE INVENTION

Optical communication systems ordinarily utilize optical fibers for propagating an optical wave, which carries signal information, from one station to another typically over a distance of many miles. While single mode propagation of the optical wave through the fibers has some advantages, such as relatively high information transmission rate capability, nevertheless such single mode propagation suffers from the need for relatively small fiber cross section and high fabrication cost. Therefore, multimode optical propagation presents attractive features over single mode propagation, even where a coherent optical source is used.

However, multimode propagation entails distortion of signal information arising from mode delay dispersion, that is, different modes (of the same optical wavelength) travel through the fiber at different forward velocities, and hence undergo different propagation time delays. Consequently, for example, a sharp signal input pulse at one end of an optical fiber exists from the other end of the fiber as an output which is spread out as a function of time. Thereby, information transmission rates (data rates) are limited by reason of the mode delay dispersion in multimode optical fibers.

SUMMARY OF THE INVENTION

In order to reduce the mode delay distortion in multimode optical fibers, modes which travel at relatively low forward velocity are converted into modes which travel at relatively high velocity (and vice versa) at selected locations between successive optical fibers running from one optical communication station to another. Thereby, the net total variation in propagation time delay, i.e., mode dispersion, of all modes propagating in the optical fibers between the two stations is reduced. In particular, since the relatively fast modes are those associated with rays directed at a relatively small angle with respect to the axis of the fiber (the relatively slow modes being directed at relatively large angle to the axis), in accordance with the invention, optical delay equalizer devices are inserted between successive fibers to convert large angle (slow) modes to small angle (fast) modes and vice versa.

In a specific embodiment of the invention, a pair of optically refracting elements having a common axis of revolution is located between a pair of optical fibers. Advantageously, these elements are glass cones, each having a spherical base surface, and situated back to back and forming a spherical air lens therebetween. In this way, large angle modes propagating in one fiber are converted by the cones to small angle modes propagating in the other fiber, and vice versa.

This invention, together with its features, advantages and objects may be better understood from the following detailed description, when read in conjunction with the drawing in which.

Figure 1:
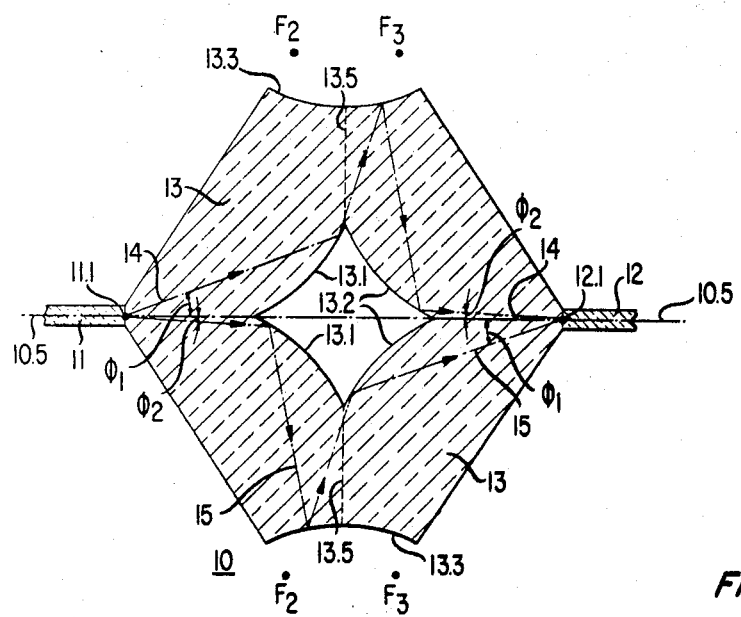
FIG. 1 shows a cross-section view of a reflection type optical delay equalizer for multimode optical fibers, in accordance with a specific embodiment of the invention.

As shown in FIG. 1, an optical fiber delay equalizer device 10 is located between an input optical fiber 11 and an output optical fiber 12. The fibers 11 and 12 are aligned along a common axis 10.5 about which a transparent glass portion 13 of the equalizer 10 is circularly symmetric as more fully described below. The glass portion 13 advantageously is made of a glass material having the same common refractive index as the fibers 11 and 12.

A point 11.1, located on the axis 10.5 on the end face of the fiber 11, serves as one of the focal points for the generation of the ellipsoidal surface 13.1 of revolution (about axis 10.5). The surface 13.1 serves as an optically reflecting boundary for the interior of the glass portion 13. Another focal point $F_2$ for this ellipsoidal surface 13.1 also serves as one of the focal points for another ellipsoidal surface 13.3 of revolution. The surface 13.3 forms a portion of the exterior optically reflecting boundary of the glass portion 13. Still another focal point $F_3$, located such that a line along $F_2F_3$ is parallel to the axis 10.5, serves as the other focal point for the ellipsoidal surface 13.3 as well as a focal point for another interior optically reflecting ellipsoidal surface 13.2. A point 12.1 on the axis of the fiber 12 serves as the other focal point for the interior ellipsoidal surface 13.2. Typically, the ellipsoidal surfaces 13.1, 13.2 and 13.3 are all coated with gold to serve as efficient optically reflecting surfaces.

By reason of the properties of ellipsoidal surface reflections, a ray 14, directed at an angle $\phi_1$ (or $\phi_2$) with respect to the axis 10.5, as the ray exits the fiber 11, is reflected by the surfaces 13.1, 13.2 and 13.3 so as to enter the fiber 12 (respectively) at an angle $\phi_2$ (or $\phi_1$) with respect to the axis 10.5, in such a way that $(\phi_1)^2 + (\phi_2)^2$ is independent of $\phi_1$ and $\phi_2$. On the other hand, the total time delay T of radiation propagating in the fibers 11 and 12 is given by: $T = L/nc$ (sec $\phi_1$ + sec $\phi_2$), where L is the (common) length of the fibers 11 and 12, $n$ is the refractive index in these fibers, and $c$ is the speed of light in vacuum. Hence, for reasonably small angles $\phi_1$ and $\phi_2$, the total time delay is proportional to $(\phi_1)^2 + (\phi_2)^2 +$ constant. Thus, since $(\phi_1)^2 + (\phi_2)^2$ is independent of angle in the device shown in FIG. 1, the delay equalization provided by the device 10 is nearly perfect for reasonably small angles.

In a typical example, by way of illustration only, the common refractive index of glass used for the fibers 11 and 12, as well as of the glass portion 13 of the device 10, is equal to about 1.5; while the numerical aperture (maximum angle of acceptance or exit of optical rays) is about 0.75. The ratio of major to minor axis of the ellipsoidal surfaces 13.1 and 13.2 is then advantageously made equal to about 2.5. The diameter of the fibers 11 and 12 is about 150 micron; the distance between $F_2$ and point 11.1 (and between $F_3$ and 12.1) is about 10 millimeters; the distance between $F_2$ and $F_3$ is about 1 millimeter; and the major to minor axis ratio of the ellipsoidal surface 13.3 is about 1:1. The unlabeled surfaces of the glass portion 13 are arbitrarily shaped and can all be flat, for example. It should also be mentioned that the glass portion 13 can be made in two separate halves and cemented together at the surface 13.5. The maximum deviation of $(\phi_1)^2 + (\phi_2)^2$ from the ideal value of $(\sec \phi_1 + \sec \phi_2)$ is only about 4 percent in this example; hence this equalizer device 10, installed in the middle of a 2.5 km transmission path, will reduce the mode dispersion from typically about 2.0 microseconds to about 0.08 microseconds, an improvement by a factor of about 25.

Figure 2:
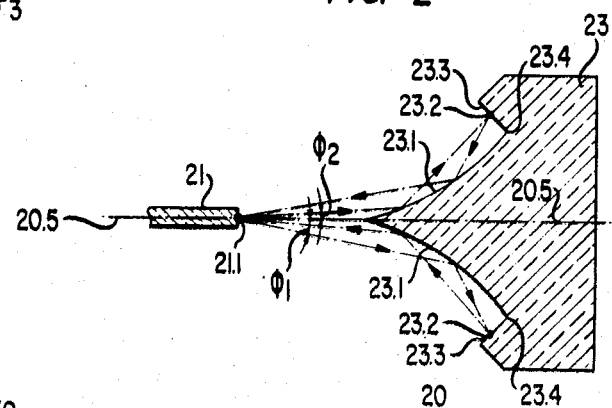
FIG. 2 shows a cross-section view of another reflection type optical delay equalizer for multimode optical fibers, in accordance with another specific embodiment of the invention.

The equalizer device 10 shown in FIG. 1 can be simplified in case the input optical fiber and output optical fiber are one and the same fiber, or in case the input and output optical fibers are located in close proximity to each other, one behind the other as viewed in FIG. 2. In such a case, as shown in FIG. 2, an optical fiber delay equalizer device 20 having an axis of revolution 20.5 is located along the same axis 20.5 as that of the fiber 21. The device 20 has an ellipsoidal optically reflecting surface of revolution 23.1 with one focus located at point 21.1 (centered on the end face of the fiber 21) and a second focus 23.2 located on an optically reflecting portion of a conical surface 23.3 of the glass portion 23. This conical surface 23.3 has an apex located on the axis 20.5 such that a ray of light exiting from the end face of the fiber 21 at an angle of $(1/\sqrt{2})$ of the maximum acceptance angle with respect to the axis 20.5 is reflected by the surface 23.1 and by the surface 23.3 back to the surface 23.1 and into the fiber 21 at the same angle, $(1/\sqrt{2})$ of the maximum acceptance in accordance with conventional geometric optical principles. Advantageously, the reflecting surfaces 23.1 and 23.3 are coated with optically reflecting layers of metal such as gold. It should be understood that when the input fiber and the output fiber are separate fibers, then a slight modification to the arrangement shown in FIG. 2 is necessary. In particular, the input and output fibers are then located in close proximity side by side with their end faces equidistant from the device 20, the fibers being oriented with mutually parallel axes in a plane perpendicular to the plane of FIG. 2. In that case, the focal point 21.1 is located midway between the axes of the two fibers. Advantageously, the distance of separation between the two fibers at their entrance and exit faces for the optical radiation is as small as mechanically feasible. In this way, again the value of $(\phi_1^2 + \phi_2^2)$ in the device 20 (FIG. 2) will be independent of angles, and hence optical delay equalization by the device 20 will be substantially the same as for the device 10 previously discussed.

In a typical example by way of illustration only, the numerical aperture of the optical fiber 21 is about 0.75 while the distance between the focal points 21.1 and 23.3 is about a centimeter. The axes ratio of the ellipsoidal surface of revolution 23.1 is about 2.5, and the surface 23.3 is a portion of a cone with an apex angle of about 22.5°.

Figure 3:
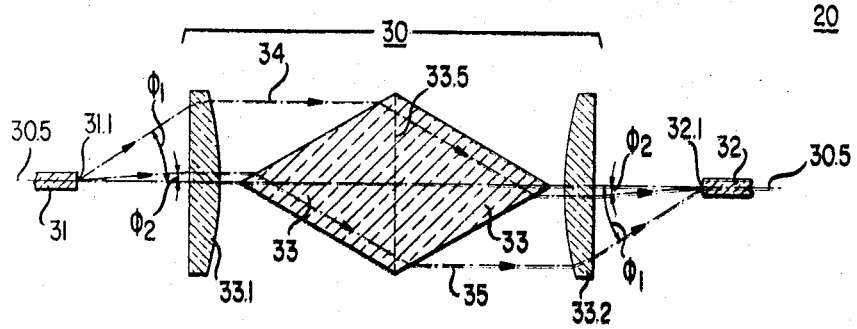
FIG. 3 shows a cross-section view of a refraction type optical delay equalizer for multimode optical fibers, in accordance with still another specific embodiment of the invention.

FIG. 3 shows an alternative optical delay equalizer device 30 utilizing optical refraction phenomena, rather than reflection phenomena as in the devices 10 and 20. The equalizer 30 is somewhat simpler to make than the equalizer 10 and does not require the side-by-side alignment of the input and output optical fibers as in FIG. 2, but at some sacrifice of precise delay equalization.

As shown in FIG. 3, an input optical fiber 31 and an output optical fiber 32 are located along a common axis 30.5, with the equalizer device 30 inserted between the fibers. The device 30 itself includes a pair of substantially identical, optically transparent right circular cones 33, together with a pair of substantially identical converging lenses 33.1 and 33.2. The lens 33.1 is located such that one of its focal points coincides with a point 31.1 centered on the end face of the fiber 31; and the lens 33.2 is located such that one of its focal points is located at a point 32.1 centered on the front face of the fiber 32. Between these lenses is located the pair of transparent cones 33, advantageously cemented back to back along their common planar base surfaces 33.5. Both cones 33 have their axis 30.5 in common with the axis of the converging lenses 33.1 and 33.2, as well as with the axis of the fibers 31 and 32.

In a typical example by way of illustration only, the cones 33 are made of dense flint glass having a refractive index of 1.73, with apex angles of 30° (angle between the axis 30.5 of revolution of the cones and their slant surfaces). The focal lengths of the lenses 33.1 and 33.2 are about 1.5 centimeter, while the common base surface 33.5 (circular boundary) has a diameter of about a centimeter.

A ray 34 exiting from the input fiber 31 at an angle of $\phi_1$ with respect to the axis 30.5 will, after being refracted by the spherical lens 33.1, the cones 33, and the spherical lens 33.2, enter the output fiber 32 at an angle of $\phi_2$ with respect to the axis 30.5 such that $(\phi_1 + \phi_2)$ is independent of either $\phi_1$ or $\phi_2$. Although this independence represents a departure from the more nearly ideal situation, where $\phi_1^2 + \phi_2^2$ is independent of angles; nevertheless, the device 30 will reduce the mode delay dispersion by a factor of about four.

Figure 4:
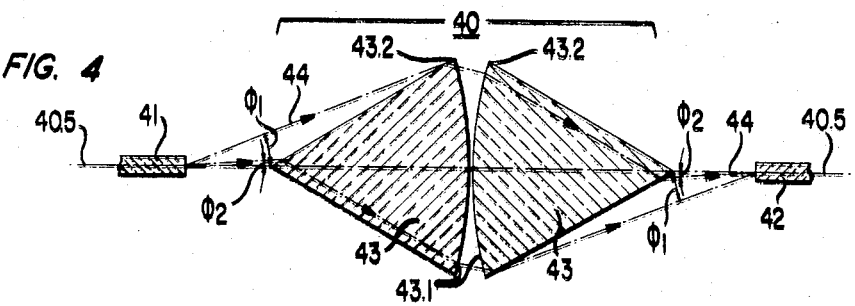
FIG. 4 shows a cross section view of still another refraction type optical delay equalizer for multimode optical fibers, in accordance with another specific embodiment of the invention.

FIG. 4 illustrates still another delay equalizer 40, having a somewhat simpler structure than the device 30 previously discussed in connection with FIG. 3. As shown in FIG. 4, an input optical fiber 41 and an output optical fiber 42 are located along a common central axis 40.5. Between these fibers is located the device 40 including a pair of substantially identical right circular cones 43, each having a spherically curved base 43.1, the (air) gap therebetween forming a converging spherical lens. The cones 43 are located advantageously as close together as mechanically feasible, or can contact each other at a point along their common axis 40.5. The focal length of the converging lens formed by the spherical surfaces 43.1 is advantageously selected such that rays emerging from fiber 41 are focused onto the front face of fiber 42.

A ray of light 44, exiting from the input fiber 41 at an angle $\phi_1$ with respect to the axis 40.5 will (after refraction through the device 40) enter the output fiber 42 at an angle $\phi_2$ with respect to the axis 40.5, such that $(\phi_1 + \phi_2)$ is independent of either of these angles. Thereby, the device 40 provides an amount of mode delay equalization similar to that furnished by the device 30 (i.e., a factor of four).

In a typical example by way of illustration only, the optical fibers 41 and 42 both have numerical apertures of about 0.42. The cones 43 are made of a dense flint glass having a refractive index of about 1.73 and an apex of about 30° each. The radii of curvature for the surfaces 43.1 is about 45 millimeters while the diameter of the circular boundary 43.2 of the bases 43.1 is about 10 millimeters. The distance between the apex of each of the cones 43 and the nearest optical fiber is about 2.5 millimeters.

It should be remarked that the optical elements 33 and 43 are both circularly symmetric, being bounded by side surfaces of revolution about their respective axes 30.5 and 40.5, so that any cross section formed by the intersection of these elements with a plane perpendicular to their respective axes is a circle.

Although this invention has been described in detail in terms of a specific embodiment, various modifications can be made without departing from the scope of the invention. For example, a molded plastic can be used as the material for the portions 13 and 23, instead of glass, in the devices 10 and 20, respectively.

What is claimed is:

1. A fiber optic mode delay equalization device which comprises a pair of optically refracting cone elements situated back to back and having a common axis of revolution for the refracting surfaces of the elements which is also in common with a common axis of a pair of optical fibers, each of said elements having a vertex on said common axis, the boundary of the cross-section of each element in any plane perpendicular to the axis being a circle, such that optical radiation ray emanating from one of the fibers at relatively small angles to the axis passes through the refracting elements and enters the other of the optical fibers at relatively large angles to the axis.

2. The device recited in claim 1 in which each of the optical elements has a refracting surface in the form of substantially identical right circular cones.

3. The device recited in claim 2 in which the base surfaces of the cones are planar and which further includes a pair of substantially identical converging lenses having an optical axis along the common axis of revolution.

4. The device in claim 2 in which the base surfaces of the cones are spherical, thereby forming an optical lens between said base surfaces.

* * * * *